US011924668B2

(12) United States Patent
Chu et al.

(10) Patent No.: US 11,924,668 B2
(45) Date of Patent: Mar. 5, 2024

(54) OPERATING PARAMETER UPDATE WITH WIDER BANDWIDTH

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US); Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 12 days.

(21) Appl. No.: 17/203,383

(22) Filed: Mar. 16, 2021

(65) Prior Publication Data

US 2021/0289386 A1 Sep. 16, 2021

Related U.S. Application Data

(60) Provisional application No. 63/148,192, filed on Feb. 11, 2021, provisional application No. 63/050,918, filed on Jul. 13, 2020, provisional application No. 62/990,389, filed on Mar. 16, 2020.

(51) Int. Cl.
*H04W 28/02* (2009.01)

(52) U.S. Cl.
CPC .............................. *H04W 28/0215* (2013.01)

(58) Field of Classification Search
CPC .. H04W 28/0215; H04W 84/12; H04W 88/08
See application file for complete search history.

(56) References Cited

U.S. PATENT DOCUMENTS

| | | | |
|---|---|---|---|
| 2004/0181692 A1* | 9/2004 | Wild ..................... | H04W 48/14 726/4 |
| 2010/0215109 A1* | 8/2010 | Onggosanusi ............ | H04L 1/06 375/260 |
| 2011/0243079 A1* | 10/2011 | Chen .................... | H04B 7/0639 370/329 |
| 2012/0155447 A1* | 6/2012 | Vermani ........... | H04W 28/0215 370/328 |
| 2016/0150524 A1* | 5/2016 | Ramkumar ........... | H04L 1/0002 370/329 |
| 2019/0141570 A1* | 5/2019 | Verma .................... | H04L 5/0007 |
| 2020/0213933 A1* | 7/2020 | Patil .................. | H04W 28/0263 |
| 2021/0168864 A1* | 6/2021 | Seok ................. | H04W 74/0816 |

(Continued)

*Primary Examiner* — Stephen J Clawson

(57) ABSTRACT

Various embodiments relate to a method performed by a first wireless device for announcing operating capabilities to a second wireless device, wherein the first wireless device and second wireless device support a first protocol and a second protocol, including: announcing by the first device original capabilities to the second device; receiving an announcement of capabilities from the second device; receiving frames from the second device in PHY Protocol Data Units (PPDUs) following the first protocol and the second protocol; announcing by the first device a change in its capabilities to the second device; and receiving frames from the second device in PPDUs transmitted using the changed capabilities following the first protocol and the second protocol, wherein the change in the capabilities includes a change in a one of a puncture parameter, bandwidth parameter, mode and coding scheme (MCS) parameter, and a number of simultaneous streams (Nss) parameter.

20 Claims, 2 Drawing Sheets

(56) References Cited

U.S. PATENT DOCUMENTS

2021/0410048 A1* 12/2021 Yu ........................ H04B 7/024
2022/0141052 A1* 5/2022 Montreuil ........... H04W 72/044
370/329

* cited by examiner

OPERATING PARAMETER UPDATE WITH WIDER BANDWIDTH

CROSS-REFERENCE TO RELATED APPLICATIONS

This application claims benefit to U.S. Provisional Patent Application Nos. 62/990,389 filed on Mar. 16, 2020, 63/050,918 filed on Jul. 13, 2020, and 63/148,192 filed on Feb. 11, 2021, the contents of each which are hereby incorporated by reference for all purposes as if fully set forth herein.

TECHNICAL FIELD

Various exemplary embodiments disclosed herein relate generally to operating parameter updates in wider bandwidth wireless networks.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method performed by a first wireless device for announcing operating capabilities to a second wireless device, wherein the first wireless device and second wireless device support a first protocol and a second protocol, including: announcing by the first device original capabilities to the second device; receiving an announcement of capabilities from the second device; receiving frames from the second device in PHY Protocol Data Units (PPDUs) following the first protocol and the second protocol; announcing by the first device a change in its operating parameters to the second device; and receiving frames from the second device in PPDUs transmitted using the changed operating parameters following the first protocol and the second protocol, wherein the change in the operating parameters includes a change in a one of a bandwidth parameter, mode and coding scheme (MCS) parameter, and a number of simultaneous streams (Nss) parameter.

Various embodiments are described, wherein a static puncture parameter is a non-OFMDA puncture pattern defined between the first station and the second station.

Various embodiments are described, wherein the puncture parameter is announced using a basic service set (BSS) operating element.

Various embodiments are described, wherein a static puncture parameter is a bitmap describing whether puncture is allowed for each 20 MHz channel.

Various embodiments are described, wherein the puncture parameter is applied across a basic service set (BSS).

Various embodiments are described, wherein the puncture parameter is applied to all bandwidths.

Various embodiments are described, wherein the puncture parameter is announced using one bitmap in a basic service set (BSS) operating element, or other element.

Various embodiments are described, wherein the operating parameter changes are carried in either HE Control field or an element.

Various embodiments are described, wherein an additional EHT OM Control in HE Control will be combined with an HE OM Control to announce the operating parameter changes when either Rx/Tx Nss is more than 8 or a bandwidth is more than 160 MHz.

Various embodiments are described, wherein the additional EHT OM Control includes a 1-bit Additional Rx BW, indicating whether the bandwidth is 320 MHz or not, 4-bit Additional Rx Nss where 8 values are for Nss values of 9 to 16 and an additional one value is used to indicate Rx Nss $\not\le$ 8 where this value indicates the maximal Nss at 80 MHz, and 4-bit Additional Tx Nss where 8 values are for Nss values of 9 to 16 and additional one value is used to indicate Rx Nss $\not\le$ 8 and this value indicates the maximal Nss at 80 MHz.

Various embodiments are described, wherein the following additional fields are added to the Operating Mode Notification element: 1-bit Additional BW, indicating whether the bandwidth is 320 MHz or not; 4-bit Additional Rx Nss where 8 values are for Nss values of 9 to 16 and an additional one value is used to indicate Rx Nss $\not\le$ 8 and this value indicates the maximal Nss at 80 MHz; and 4-bit Additional Tx Nss where 8 values are for Nss values of 9 to 16 and additional one value is used to indicate Rx Nss $\not\le$ 8 and this value indicates the maximal Nss at 80 MHz.

Various embodiments are described, wherein the second device derives the operating parameters of the first device based upon the announcement carried in the HE control field or the element.

Various embodiments are described, wherein the derived operating parameters of the first device at different bandwidths and MCS values for the first protocol are based upon announced respective bandwidths and MCS values for the first protocol of the original capabilities.

Various embodiments are described, wherein the derived operating parameters for the second protocol at different bandwidths and MCS values are based upon the derived Nss for the first protocol at the respective bandwidths and MCS values.

Various embodiments are described, wherein setting the HE transmit Nss value at a bandwidth and MCS combination to a value of 8 if the EHT transmit Nss value is greater than 8 at the bandwidth and MCS combination, otherwise set the HE transmit Nss value to the EHT transmit and receive Nss value at the bandwidth and MCS combination.

Various embodiments are described, wherein setting the HE receive Nss value at a bandwidth and MCS combination to a value of 8 if the EHT receive Nss value is greater than 8 at the bandwidth and MCS combination, otherwise set the HE receive Nss value to the EHT receive Nss value at the bandwidth and MCS combination.

Various embodiments are described, further comprising determining an EHT Rx Nss value EHTRxNss_SPECIFICBW_SPECIFICMCS having a bandwidth value of SPECIFICBW and an MCS value of SPECIFICMCS wherein SPECIFICBW is one of 160 MHz and 320 MHz to be:

EHTRxNss_SPECIFICBW_SPECIFICMCS=floor
{Max_EHTRxNss_SPECIFICBW_SPECIFICMCS*
(EHT Rx NSS)/Max_EHTRxNss_80 MHZ_All_
MCS}, where Max_EHTRxNss_SPECIFICBW_SPECIFICMCS is the Rx EHT Nss at a bandwidth of SPECIFICBW and an MCS of SPECIFICMCS, Max_EHTRxNss_80 MHZ_All_MCS is the maximal EHT Rx Nss at a bandwidth of 80 MHz and all MCS values, and EHT Rx NSS is the Nss value announced in an EHT OM.

Various embodiments are described, further comprising determining an EHT Tx Nss value EHTTxNss_SPECIFICBW_SPECIFICMCS having a bandwidth value of SPECIFICBW and an MCS value of SPECIFICMCS wherein SPECIFICBW is one of 160 MHz and 320 MHz to be:

EHTTxNssSPECIFICBW_SPECIFICMCS=floor
{Max_EHTTxNss_SPECIFICBW_SPECIFICMCS*
(EHT Tx NSS)/Max_EHTTxNss_80 MHZ_All_
MCS}, where Max_EHTTxNss_SPECIFICBW_SPECIFICMCS is the Tx EHT Nss at a bandwidth of SPECIFICBW and an MCS of SPECIFICMCS, Max_EHTTxNss_80 MHZ_All_MCS is the maximal EHT Tx Nss at a bandwidth of 80 MHz and all MCS values, and EHT Tx NSS is the Nss value announced in an EHT OM.

Various embodiments are described, further comprising determining an EHT Rx Nss value EHTRxNss_80 MHZ_SPECIFICMCS at 80 MHz and an MCS value of SPECIFICMCS wherein a SPECIFICBW is 80 MHz to:

EHTRxNss_80 MHZ_SPECIFICMCS=floor
{Max_EHTRxNss_80 MHZ_SPECIFICMCS*
(EHT Rx NSS)/Max_EHTRxNss_80 MHZ_All_
MCS} where Max_EHTRxNss_80 MHZ_SPECIFICMCS is the Rx EHT Nss at a bandwidth of 80 MHz and an MCS value of SPECIFICMCS, Max_EHTRxNss_80 MHZ_All_MCS is the maximal EHT Rx Nss at a bandwidth of 80 MHz and all MCS values, and EHT Rx NSS is the Nss value announced in one of an EHT OM, an EHT OM, and an Operating Mode Notification with EHT additional BW/Nss field.

Various embodiments are described, further comprising determining an EHT Tx Nss value EHTTxNss_80 MHZ_SPECIFICMCS at 80 MHz and an MCS value of SPECIFICMCS wherein a SPECIFICBW is 80 MHz to:

EHTTxNss_80 MHZ_SPECIFICMCS=floor
{Max_EHTTxNss_80 MHZ_SPECIFICMCS*
(EHT Tx NSS)/Max_EHTTxNss_80 MHZ_All_
MCS} where Max_EHTTxNss_80 MHZ_SPECIFICMCS is the Tx EHT Nss at a bandwidth of 80 MHz and an MCS value of SPECIFICMCS, Max_EHTTxNss_80 MHZ_All_MCS is the maximal EHT Tx Nss at a bandwidth of 80 MHz and all MCS values, and EHT Tx NSS is the Nss value announced in one of an EHT OM, an EHT OM, and an Operating Mode Notification with EHT additional BW/Nss field.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
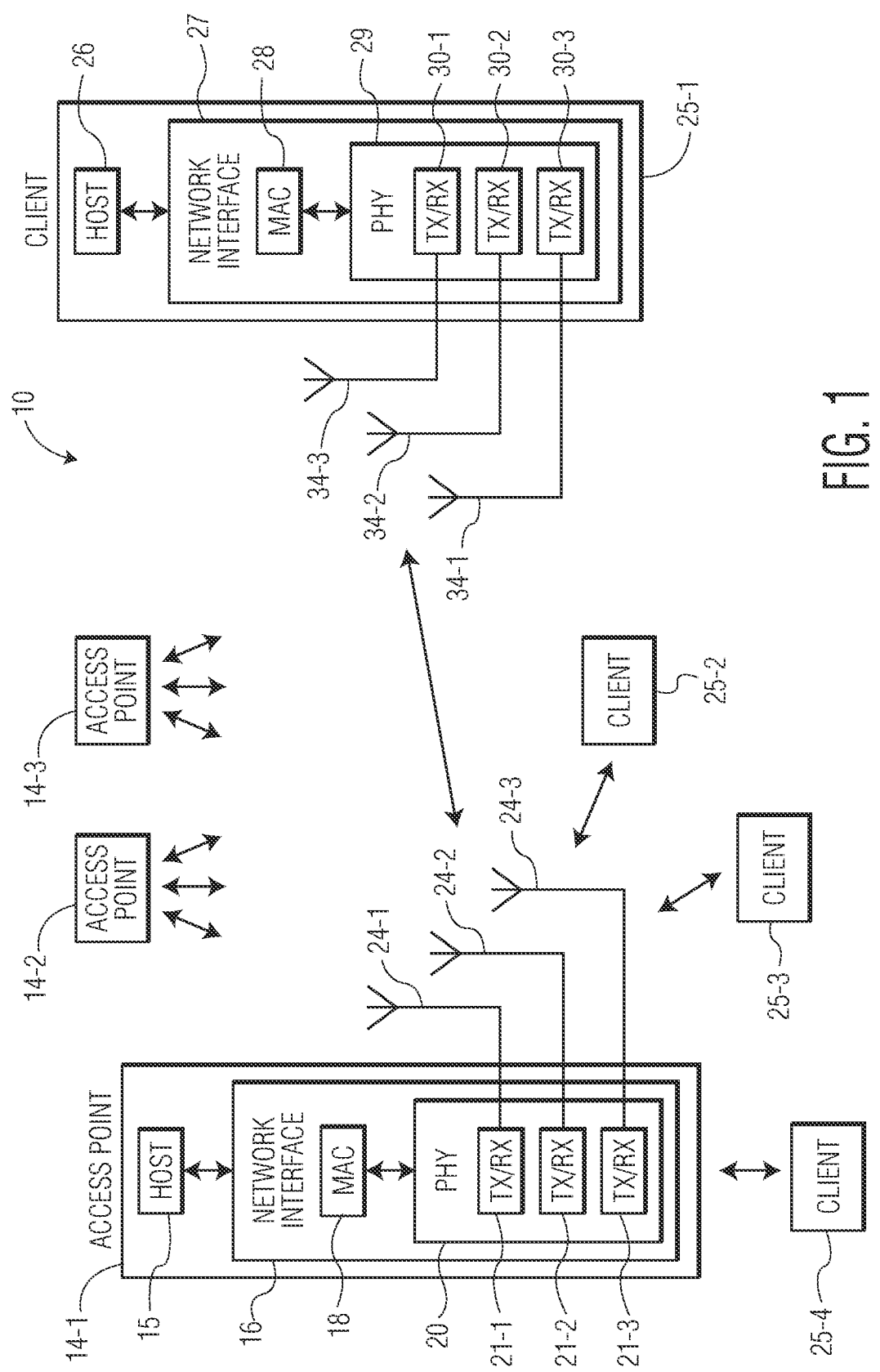
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams. Also, the client stations 25 are configured to receive data streams that are transmitted simultaneously by multiple APs 14. Likewise, the client stations 25 may transmit data streams simultaneously to the multiple APs 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

An AP or a STA may advertise the range of operating parameters that they are capable of supporting. When a connection between and AP and a STA is made, the specific operating parameters are determined based upon the capabilities of the AP and the STA and the channel conditions. During operation, either the AP or STA may need to make a change in the operating parameters, e.g., for power save, improve the throughput. The operating parameters may include the bandwidth (BW), number of supported streams (NSS), and the modulation and coding scheme (MCS).

Operating parameter updates for VHT and HE will first be outlined. The Operating Mode Notification element is used for VHT operating parameter changes such as BW, MCS, and Nss. The Operating Mode Notification element also changes the HE operating parameters. The VHT basic service set (BSS) BW may be up to 160 MHz. Further, the VHT MCS is limited to 256 QAM and up to an Nss of 4.

An OM Control field is used for HE operating parameter changes such as BW, MCS, Nss, and UL MU (Data) Disable. The OM Control field also changes the VHT operating parameters. The HE BSS BW in the 5/6 GHz band may be up to 160 MHz. HE BSS BW in the 2.4 GHz band may be up to 40 MHz. Further, the HE MCS is limited to 1024 QAM and up to an Nss of 8.

With EHT the various operating parameters have increased. For example, EHT BSS BW may be up to 320 MHz, the EHT MCS may be up to 2048QAM, and the EHT Nss may be up to 16. EHT also allows for the puncturing of 20 MHz channels. An EHT AP can announce its operating BW change as well as other changes. An EHT STA can announce its Rx/Tx BW change as well as other changes.

For EHT the maximum value for Nss is 16, but the different bandwidths and different MCSs may support different Nss values. Accordingly rules are needed to take a single advertised maximum Nss and to determine the various Nss values for different bandwidth and MCSs. One way of determining the Nss for different bandwidths and MCS values is to use a proportional rule. One method of carrying the announced new operating Nss is to define an OM control filed in the MAC header. The MAC header may include an HE control that carries the Nss for receive and for transmit and the channel bandwidth.

Further, with the transition to EHT, puncture rules need to be defined. Also, parameter updates for bandwidths greater than 160 MHz also will also need to be supported.

For EHT BSS channel puncture, static channel puncture is allowed where the channel puncture is defined by BSS operating element, meaning that the portions of the bandwidth that may be punctured are statically defined.

In EHT, in order to simplify the implementation some specific channel puncture patterns are defined for non-OFMDA transmission (non-OFDMA puncture patterns) between AP and STA. In one embodiment, an AP is allowed to select the BSS static operating channel puncturing from the non-OFDMA puncture patterns. Hence, an EHT AP can only select and announce its static BSS channel puncture from one of the allowed non-OFDMA puncture patterns. In one embodiment, an AP announces/describes its BSS static channel puncture using a per 20 MHz channel bitmap. That is each 20 MHz channel of the operating bandwidth has a bit indicating if puncture is allowed.

A second channel puncture approach allows an AP to select its BSS static operating channel puncture that go beyond the non-OFDMA puncture patterns (i.e., EHT SU/MU PPDU being addressed to a single STA/AP). With this option, any 20 MHz channels covered by BSS operating channel may be punctured. This may be accomplished using a per 20 MHz channel bitmap to describe the BSS operating channel puncture. That is each 20 MHz channel of the operating bandwidth has a bit indicating if puncture is allowed. In this option, any combination of 20 MHz channels may be indicated as allowing for puncture.

There are two different options for implementing the EHT BSS Channel Puncture Coding. A first EHT BSS channel puncture coding option includes using joint coding (compressed coding), i.e., each allowed non-OFDMA puncture pattern is identified by one value, to describe the BSS operating channel puncture. A second EHT BSS channel puncture coding option includes using a per 20 MHz channel bitmap to describe the BSS operating channel puncture.

The following method of static channel puncture announcement may be used: an AP announces the channel puncture change through the modification of EHT Operating element.

The EHT operating parameter changes may be made by changing or defining a new HE Control field or an element. Four different approaches will now be described.

A first EHT operating parameter change option includes defining a new HE Control field (e.g., EHT OM Control) that is used to announce the EHT Operating Parameter Change that includes the following:
  3-bit BW that indicates which bandwidth 20, 40, 80, 160, 320 MHz is specified;
  4-bit Rx Nss field that indicates Nss values of 1 to 16. This field may have two options: option 1: maximal Nss at 80 MHz; or option 2: maximal Nss at the announced BW;
  4-bit Tx Nsts field that indicates Nsts values of 1 to 16;
  1-bit upload (UL) multi-user (MU) Disable; and
  1-bit UL MU Data Disable that along with UL MU Disable defines the availability of UL MU operation.

A second EHT operating parameter change option includes a new HE Control field (e.g., Addition EHT OM Control) that is used to announce the additional EHT Operating Parameter Change that includes the following:
  1-bit Additional BW, i.e., whether BW is 320 or not;
  4-bit Additional Rx Nss, i.e., for Nss values of 9 to 16 (8 different values to indicate 9 to 16), and additional one value to indicate Rx Nss <=8; this field indicates the maximal Nss at 80 MHz; and 4-bit Additional Tx Nss, i.e., for Nss values of 9 to 16 (8 different values to indicate 9 to 16), and additional one value to indicate Tx Nss <=8; this field indicates the maximal Nss at 80 MHz.

The Addition EHT OM Control will be combined with HE OM Control to announce the operating parameter changes when either Rx/Tx Nss is more than 8 or BW is more than 160 MHz.

A variant to second operation parameter change is that 3-bit Additional Rx Nss and 3-bit Rx Nss are defined where 0 to indicates <=8 Nss support, 1 to 6 to indicates 9 to 14 Nss support respectively, and 7 to indicate 15 and 16 Nss support.

A third EHT operating parameter change option includes adding the additional fields to Operating Mode Notification element (Enhanced Operating Mode Notification element):

1-bit Additional Rx BW, i.e., whether BW is 320 or not; when the Channel Width is 160 MHz, the Additional BW field indicates whether the BW is really 320 MHz;

Additional Tx Nss field; when the Tx Nss indicates 8, the Additional Tx Nss field indicates whether the Tx Nss is really 9, 10, 11, 12, 13, 14, 15, 16 at <=80 MHz BW; and Additional Rx Nss field; when the Rx Nss indicates 8, the Additional Rx Nss field indicates whether the Rx Nss is really 9, 10, 11, 12, 13, 14, 15, 16 at <=80 MHz BW.

The Additional Rx/Tx Nss field may be 4-bit field where 8 values are used to indicate the Nss value of 9 to 16 respectively and additional one value is used to indicate <=8 Nss. Another option is that Additional Rx/Tx Nss field may be 3-bit field where 6 values are used to indicate the Nss value of 9 to 14, one value is used to indicate the Nss of 15 and 16, and additional one value is used to indicate <=8 Nss.

A fourth EHT operating parameter change option includes defining a new element EHT Operating Mode Notification element (EHT Operating Mode Notification element) as follows:

3-bit BW that indicates which bandwidth 20. 40, 80, 160, 320 MHz is specified;

4-bit Rx Nss field that indicates Nss values of 1 to 16;

1-bit No low-density parity check (LDPC), i.e., indicating support for the transmission and reception of LDPC encoded PHY Protocol Data Units (PPDUs); and 1-bit Rx Nss Type.

The HE OM Control or the fields of Operating Mode Notification element defined in VHT applies to EHT parameter changes and HE/VHT parameter change unless the EHT OM Control or the new fields for Operating Mode Notification (or EHT Operating Mode Notification) is also announced in the same frame, in which case the following rules are used:

HE OM Control or the fields of Operating Mode Notification element defined in VHT applies to HE/VHT parameter change; and the EHT OM Control or the new fields for Operating Mode Notification (or EHT Operating Mode Notification) applies to EHT parameter changes.

Four different options for calculating various Rx/TxNss values for various BW+MCS combinations based on the announced single Rx/Tx Nss value respectively will be described. In a first EHT OM or Operating Mode Notification with EHT additional BW/Nss field for Nss announcement option, the EHT OM or Operating Mode Notification with EHT additional BW/Nss field transmitted by an EHT STA to an EHT AP may be used to notify the EHT AP of the EHT STA's Tx Nss, Rx Nss for EHT PPDUs and HE PPDUs. An EHT OM or Operating Mode Notification with EHT additional BW/Nss field transmitted by the EHT AP to the EHT STA may be used to notify the EHT STA of the EHT AP's Tx Nss, Rx Nss for EHT PPDUs and HE PPDUs.

The EHT Rx Nss (EHTRxNss_SPECIFICBW_SPECIFICMCS) having a BW value of SPECIFICBW and an MCS value of SPECIFICMCS where SPECIFIC_BW is 160 or 320 is:

EHTRxNss_SPECIFICBW_SPECIFICMCS=floor
{Max_EHTRxNss_SPECIFICBW_SPECIFICMCS*
(EHT Rx NSS)/Max_EHTRxNss_80 MHZ_All_
MCS}, where: Max_EHTRxNss_SPECIFICBW_SPECIFICMCS is the Rx EHT Nss at BW of SPECIFICBW and MCS of SPECIFICMCS; Max_EHTRxNss_80 MHZ_All_MCS is the maximal EHT Rx Nss at BW of 80 MHz and all MCS; and EHT Rx NSS is the Nss value announced in the EHT OM.

The EHT Rx Nss (EHTRxNss_80 MHZ_SPECIFICMCS) at 80 MHz and an MCS value of SPECIFICMCS where SPECIFIC_BW is 80 MHz is:

EHTRxNss_80 MHZ_SPECIFICMCS=floor
{Max_EHTRxNss_80 MHZ_SPECIFICMCS*
(EHT Rx NSS)/Max_EHTRxNss_80 MHZ_All_
MCS} where: Max_EHTRxNss_80 MHZ_SPECIFICMCS is the Rx EHT Nss at a BW of 80 MHz and an MCS of SPECIFICMCS; Max_EHTRxNss_80 MHZ_All_MCS is the maximal EHT Rx Nss at a BW of 80 MHz and all MCS; and EHT Rx NSS is the Nss value announced in EHT OM or EHT OM or Operating Mode Notification with EHT additional BW/Nss field.

The EHT Tx Nss determination follows the same rules and may be calculated using the same equations above where Rx is replaced by Tx.

In a second EHT OM or Operating Mode Notification with EHT additional BW/Nss field for Nss announcement option, the EHT OM or Operating Mode Notification with EHT additional BW/Nss field transmitted by the EHT STA to the EHT AP may be used to notify the EHT AP of the EHT STA's Tx Nss, Rx Nss for EHT PPDUs and HE PPDUs. An EHT OM or Operating Mode Notification with EHT additional BW/Nss field transmitted by the EHT AP to the EHT STA may be used to notify the EHT STA of the EHT AP's Tx Nss, Rx Nss for EHT PPDUs and HE PPDUs.

The value of HE Rx Nss (HERxNss_SPECIFICBW_SPECIFICMCS) having a BW value of SPECIFICBW and an MCS value of SPECIFICMCS where SPECIFIC_BW is 160 MHz may be determined as follows:

HERxNss_SPECIFICBW_SPECIFICMCS is the same as EHTRxNss_SPECIFICBW_SPECIFICMCS if EHTRxNss_SPECIFICBW_SPECIFICMCS is no more than 8;

HERxNss_SPECIFICBW_SPECIFICMCS is 8 if EHTRxNss_SPECIFICBW_SPECIFICMCS is more than 8, where EHTRxNss_SPECIFICBW_SPECIFICMCS is the updated EHT Rx Nss at a BW value of SPECIFICBW and an MCS value of SPECIFICMCS.

The HE Rx Nss (HERxNss_80 MHZ_SPECIFICMCS) at 80 MHz and an MCS value of SPECIFICMCS where SPECIFIC_BW is 80 MHz may be determined as follows:

HERxNss_SPECIFICBW_SPECIFICMCS is the same as EHTRxNss_SPECIFICBW_SPECIFICMCS if EHTRxNss_SPECIFICBW_SPECIFICMCS is no more than 8;
HERxNss_SPECIFICBW_SPECIFICMCS is 8 if EHTRxNss_SPECIFICBW_SPECIFICMCS is more than 8,
where EHTRxNss_SPECIFICBW_SPECIFICMCS is the updated EHT Rx Nss at a BW value of SPECIFICBW and an MCS value of SPECIFICMCS.

HE Tx Nss determination follows the same rules and may be calculated using the same equations above where Rx is replaced by Tx.

In a third HE OM or Operating Mode Notification without EHT additional BW/Nss field for Nss announcement option, the OM transmitted by an EHT STA to an EHT AP may be used to notify the EHT AP of the EHT STA's Tx Nss, Rx Nss for EHT PPDUs and HE PPDUs. An OM transmitted by the EHT AP to the EHT STA may be used to notify the EHT STA of the EHT AP's Tx Nss, Rx Nss for EHT PPDUs and HE PPDUs.

The EHT Rx Nss (EHTRxNss_SPECIFICBW_SPECIFICMCS) at a BW value of SPECIFICBW and an MCS value of SPECIFICMCS where SPECIFIC_BW is 160 is:

EHTRxNss_SPECIFICBW_SPECIFICMCS=Floor
{Max_EHTRxNss_SPECIFICBW_SPECIFICMCS*
(Rx NSS)/Max_HERxNss_80 MHZ_All_MCS}, where: Max_EHTRxNss_SPECIFICBW_SPECIFICMCS is the Rx EHT Nss at a BW value of SPECIFICBW and an MCS value of SPECIFICMCS; Max_HERxNss_80 MHZ_All_MCS is the maximal HE Rx Nss at a BW value of 80 MHz and all MCS; and Rx NSS is the Nss value announced in the HE OM or Operating Mode Notification without EHT additional BW/Nss field.

The EHT Rx Nss (EHTRxNss_80 MHZ_SPECIFICMCS) at 80 MHz and an MCS value of SPECIFICMCS where SPECIFIC_BW is 80 MHz is:

EHTRxNss_80 MHZ_SPECIFICMCS=floor
{Max_EHTRxNss_80 MHZ_SPECIFICMCS*
(Rx NSS)/Max_HERxNss_80 MHZ_All_MCS} where: Max_EHTRxNss_80 MHZ_SPECIFICMCS is the Rx EHT Nss at a BW value of 80 MHz and an MCS value of SPECIFICMCS; Max_HERxNss_80 MHZ_All_MCS is the maximal HE Rx Nss at a BW value of 80 MHz and all MCS; and Rx NSS is the Nss value announced in HE OM or Operating Mode Notification without EHT additional BW/Nss field.

EHT Tx Nss determination follows the same rules and may be calculated using the same equations above where Rx is replaced by Tx.

In a fourth HE OM or Operating Mode Notification without EHT additional BW/Nss field for Nss announcement option, the OM transmitted by EHT STA to EHT AP may be used to notify the EHT AP of the EHT STA's Tx Nss, Rx Nss for EHT PPDUs and HE PPDUs. An OM transmitted by EHT AP to EHT STA may be used to notify the EHT STA of the EHT AP's Tx Nss, Rx Nss for EHT PPDUs and HE PPDUs.

The HE Rx Nss (HERxNss_SPECIFICBW_SPECIFICMCS) at a BW value of SPECIFICBW and an MCS value of SPECIFICMCS where SPECIFIC_BW is 160 MHz is:

HERxNss_SPECIFICBW_SPECIFICMCS=floor
{Max_HERxNss_SPECIFICBW_SPECIFICMCS*
(Rx NSS)/Max_HERxNss_80 MHZ_All_MCS} where: Max_HERxNss_SPECIFICBW_SPECIFICMCS is the Rx HE Nss at a BW value of SPECIFICBW and an MCS value of SPECIFICMCS; Max_HERxNss_80 MHZ_All_MCS is the maximal HE Rx Nss at a BW value of 80 MHz and all MCS; and Rx NSS is the value announced in HE OM or Operating Mode Notification without EHT additional BW/Nss field.

The HE Rx Nss (HERxNss_80 MHZ_SPECIFICMCS) at 80 MHz and an MCS value of SPECIFICMCS where SPECIFIC_BW is 80 MHz is:

HERxNss_80 MHZ_SPECIFICMCS=floor
{Max_HERxNss_80 MHZ_SPECIFICMCS*
(EHT Rx NSS+1)/Max_EHTRxNss_80
MHZ_All_MCS} where: Max_HERxNss_80 MHZ_SPECIFICMCS is the Rx HE Nss at a BW value of 80 MHz and an MCS value of SPECIFICMCS; Max_EHTRxNss_80 MHZ_All_MCS is the maximal EHT Rx Nss at a BW value of 80 MHz and all MCS; and Rx NSS is the value announced in HE OM or Operating Mode Notification without EHT additional BW/Nss field.

HE Tx Nss determination follows the same rules and may be calculated using the same equations above where Rx is replaced by Tx.

For the OM (OM Control or operating mode notification) for BW Announcement, the OM transmitted by the EHT STA to the EHT AP may be used to notify the EHT AP of the EHT STA's Tx BW, Rx BW for EHT PPDUs and HE PPDUs. A OM transmitted by EHT AP to EHT STA may be used to notify the EHT STA of the EHT AP's Tx BW, Rx BW for EHT PPDUs and HE PPDUs. The effects of an OM announcement of a BW depends upon whether static BSS channel puncture is being used.

Without static BSS channel puncture, when an OM announces a bandwidth BW ≤160 MHz, the HE BW will be same as the EHT BW. Otherwise the HE BW will be 160 MHz.

With static BSS channel puncture, when an EHT OM announces a bandwidth BW ≤160 MHz that include punctured 20 MHz channels, the HE BW will be the maximum BW that does not include any punctured 20 MHz channel. When an EHT OM announces a bandwidth BW ≤160 MHz that does not include punctured 20 MHz channels, the HE BW will be the same bandwidth as the announced bandwidth. When an EHT OM announces a bandwidth BW of 320 MHz and the primary 160 MHz does not include the punctured 20 MHz channel, the HE BW will be 160 MHz. When an EHT OM announces a bandwidth BW of 320 MHz and the primary 160 MHz include the punctured 20 MHz channel, the HE BW will be the maximum BW that does not include any punctured 20 MHz channel.

Figure 2:
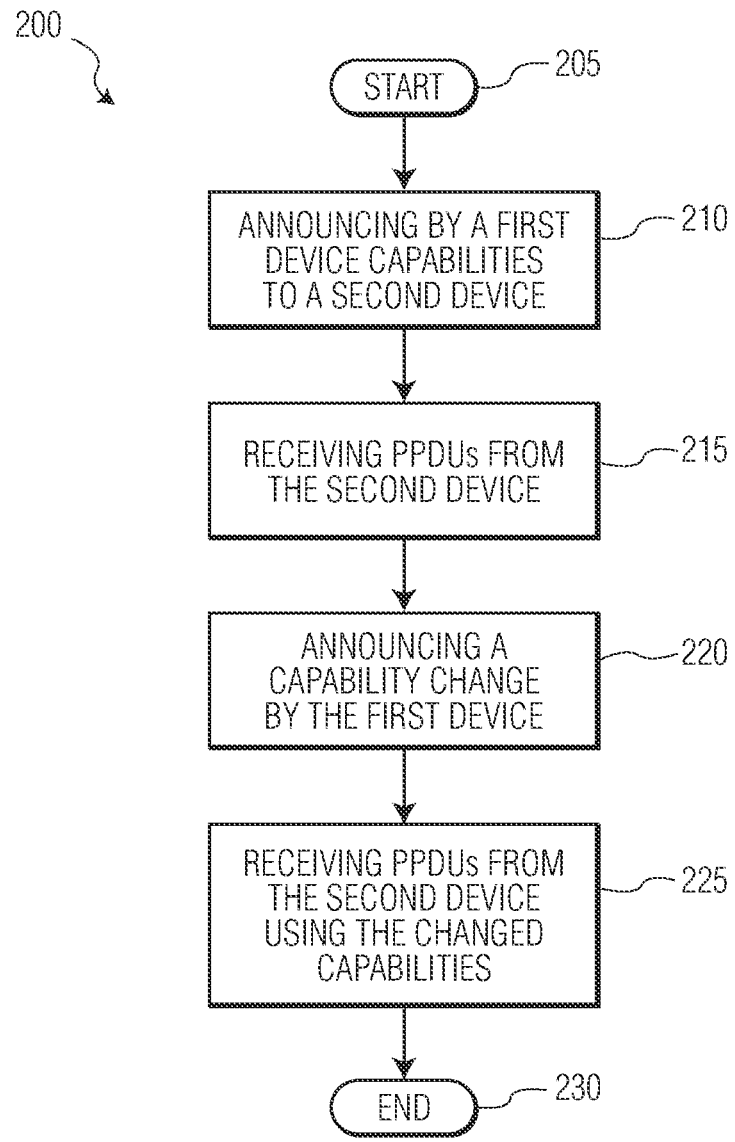
FIG. 2 shows a method for carrying out the parameter change between a first device and as second device.

FIG. 2 shows a method for carrying out the parameter change between a first device and as second device. The first device may be an AP, and the second device may be a STA. In other embodiments, the first device may be a STA, and the second device may be an AP. The first and second devices are capable of supporting one or more protocols, such as for example VHT, HE, and EHT. The method 200 beings 204, and the first device announces capabilities to use in communicating with it 210. When the first device is an AP, the first device will also announce BSS capabilities. The second device will receive these capabilities and send PPDUs to the first device based upon these capabilities 215. Then the first device will announce a capabilities change 220. Such change may be any of the changes described herein. Further, the capability changes may be announces using the various messages and methods described herein, including using modified HE and EHT messages or new HE and EHT messages The second device receives the announce of the capability change from the first device, and transmits PPDUs to the first device based upon the capability change 225. The second device may respond to the capability changes as described herein. Further, various capabilities, such as for example Nss, may be derived based upon various announced capabilities for the different protocols as described herein. The method may then end at 230. It is noted that, the second device may likewise independently announce capabilities to the first device or other devices as well. Further, PPDU's sent from the first device to the second device may be sent using the changed capabilities.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A first wireless device for announcing operating capabilities to a second wireless device, wherein the first wireless device and second wireless device support a first protocol and a second protocol, comprising:
 a processor configured to,
 announce original capabilities to the second wireless device;
 receive an announcement of capabilities from the second wireless device;
 receive frames from the second wireless device in PHY Protocol Data Units (PPDUs) encoded using the first protocol and the second protocol;
 announce a change in the first wireless device operating parameters to the second wireless device; and
 receive frames from the second wireless device in PPDUs transmitted using the changed operating parameters encoded using the first protocol and the second protocol,
 wherein the change in the operating parameters includes a change in a one of a bandwidth parameter, modulation and coding scheme (MCS) parameter, and a number of simultaneous streams (Nss) parameter;
 wherein the operating parameter changes are carried in either HE (High Efficiency) OM (Operating Mode) Control field or another element;
 wherein the processor is further configured to define a new EHT (Extreme High Throughput) OM (Operating Mode) Control field to announce EHT operating parameter changes; and
 wherein the processor is further configured to combine the new EHT OM Control field with the HE OM Control field to announce the operating parameter changes when either Rx/Tx Nss is more than 8 or a bandwidth is more than 160 MHz.

2. The first wireless device of claim 1,
 wherein the processor is configured to announce a static puncture parameter that defines a non-OFDMA (Orthogonal Frequency Division Multiplexing Access) puncture pattern between the first station and the second station.

3. The first wireless device of claim 2,
 wherein the static puncture parameter is announced using a basic service set (BSS) operating element.

4. The first wireless device of claim 1,
 wherein the processor is configured to announce a the static puncture parameter that defines a bitmap describing whether puncture is allowed for each 20 MHz channel.

5. The first wireless device of claim 4,
 wherein the static puncture parameter is applied across a basic service set (BSS).

6. The first wireless device of claim 4,
 wherein the static puncture parameter is applied to all bandwidths.

7. The first wireless device of claim 4,
 wherein the static puncture parameter is announced using one bitmap in a basic service set (BSS) operating element, or another element.

8. The first wireless device of claim 1,
 wherein the new EHT OM Control field includes
 a 1-bit Additional Rx BW, indicating whether the bandwidth is 320 MHz or not,
 4-bit Additional Rx Nss where 8 values are for Nss values of 9 to 16 and an additional one value is used to indicate Rx Nss=8 where this value indicates the maximal Nss at 80 MHz, and
 4-bit Additional Tx Nss where 8 values are for Nss values of 9 to 16 and additional one value is used to indicate Rx Nss=8 and this value indicates the maximal Nss at 80 MHz.

9. The first wireless device of claim 1,
 wherein the operating parameters further include:
 1-bit Additional BW, indicating whether the bandwidth is 320 MHz or not;
 4-bit Additional Rx Nss where 8 values are for Nss values of 9 to 16 and an additional one value is used to indicate Rx Nss=8 and this value indicates the maximal Nss at 80 MHz; and
 4-bit Additional Tx Nss where 8 values are for Nss values of 9 to 16 and additional one value is used to indicate Rx Nss=8 and this value indicates the maximal Nss at 80 MHz.

10. The first wireless device of claim 1,
 wherein the first wireless device announcements enable the second wireless device to derive the operating parameters of the first wireless device based upon the announcement carried in the HE Control field or the another element.

11. The first wireless device of claim 10,
wherein the derived operating parameters of the first wireless device at different bandwidths and MCS values for the first protocol are based upon announced respective bandwidths and MCS values for the first protocol of the original capabilities.

12. The first wireless device of claim 11,
wherein the derived operating parameters for the second protocol at different bandwidths and MCS values are based upon the derived Nss for the first protocol at the respective bandwidths and MCS values.

13. The first wireless device of claim 11,
wherein the processor in the first wireless device is configured to determine EHT transmit (Tx) and receive (Rx) Nss values;
wherein the first wireless device is configured to set the HE transmit Nss value at a bandwidth and MCS combination to a value of 8 if the EHT transmit (Tx) Nss value is greater than 8 at the bandwidth and MCS combination, otherwise set the HE transmit Nss value to the EHT transmit (Tx) and receive (Rx) Nss value at the bandwidth and MCS combination.

14. The first wireless device of claim 11,
wherein the processor in the first wireless device is configured to determine an EHT receive (Rx) Nss value;
wherein the first wireless device is configured to set the HE receive Nss value at a bandwidth and MCS combination to a value of 8 if the EHT receive (Rx) Nss value is greater than 8 at the bandwidth and MCS combination, otherwise set the HE receive Nss value to the EHT receive (Rx) Nss value at the bandwidth and MCS combination.

15. The first wireless device of claim 11,
wherein the processor in the first wireless device is configured to determine an EHT Rx Nss value EHTRxNss_SPECIFICBW_SPECIFICMCS having a bandwidth value of SPECIFICBW and an MCS value of SPECIFICMCS wherein SPECIFICBW is one of 160 MHz and 320 MHz to be:

EHTRxNss_SPECIFICBW_SPECIFICMCS=floor
{Max_EHTRxNss_SPECIFICBW_SPECIFICMCS*
(EHT Rx NSS)/
Max_EHTRxNss_80MHZ_All_MCS}, where Max_EHTRxNss_SPECIFICBW_SPECIFICMCS is the Rx EHT Nss at a bandwidth of SPECIFICBW and an MCS of SPECIFICMCS, Max_EHTRxNss_80 MHZ_All_MCS is the maximal EHT Rx Nss at a bandwidth of 80 MHz and all MCS values, and EHT Rx NSS is the Nss value announced in an EHT OM.

16. The first wireless device of claim 11,
wherein the processor in the first wireless device is configured to determine an EHT Tx Nss value EHTTxNss_SPECIFICBW_SPECIFICMCS having a bandwidth value of SPECIFICBW and an MCS value of SPECIFICMCS wherein SPECIFICBW is one of 160 MHz and 320 MHz to be:

EHTTxNss_SPECIFICBW_SPECIFICMCS=floor
{Max_EHTTxNss_SPECIFICBW_SPECIFICMCS*
(EHT Tx NSS)/
Max_EHTTxNss_80MHZ_All_MCS}, where Max_EHTTxNss_SPECIFICBW_SPECIFICMCS is the Tx EHT Nss at a bandwidth of SPECIFICBW and an MCS of SPECIFICMCS, Max_EHTTxNss_80 MHZ_All_MCS is the maximal EHT Tx Nss at a bandwidth of 80 MHz and all MCS values, and EHT Tx NSS is the Nss value announced in an EHT OM.

17. The first wireless device of claim 11,
wherein the processor in the first wireless device is configured to determine an EHT Rx Nss value EHTRxNss_80 MHZ_SPECIFICMCS at 80 MHz and an MCS value of SPECIFICMCS wherein a SPECIFICBW is ≤80 MHz to:

EHTRxNss_80MHZ_SPECIFICMCS=floor
{Max_EHTRxNss_80MHZ_SPECIFICMCS*
(EHT Rx NSS)/
Max_EHTRxNss_80MHZ_All_MCS} where Max_EHTRxNss_80 MHZ_SPECIFICMCS is the Rx EHT Nss at a bandwidth of 80 MHz and an MCS value of SPECIFICMCS, Max_EHTRxNss_80 MHZ_All_MCS is the maximal EHT Rx Nss at a bandwidth of 80 MHz and all MCS values, and EHT Rx NSS is the Nss value announced in one of an EHT OM, an EHT OM, and an Operating Mode Notification with EHT additional BW/Nss field.

18. The first wireless device of claim 11,
wherein the processor in the first wireless device is configured to determine an EHT Tx Nss value EHTTxNss_80 MHZ_SPECIFICMCS at 80 MHz and an MCS value of SPECIFICMCS wherein a SPECIFICBW is 80 MHz to:

EHTTxNss_80MHZ_SPECIFICMCS=floor
{Max_EHTTxNss_80MHZ_SPECIFICMCS*
(EHT Tx NSS)/
Max_EHTTxNss_80MHZ_All_MCS} where Max_EHTTxNss_80 MHZ_SPECIFICMCS is the Tx EHT Nss at a bandwidth of 80 MHz and an MCS value of SPECIFICMCS, Max_EHTTxNss_80 MHZ_All_MCS is the maximal EHT Tx Nss at a bandwidth of 80 MHz and all MCS values, and EHT Tx NSS is the Nss value announced in one of an EHT OM, an EHT OM, and an Operating Mode Notification with EHT additional BW/Nss field.

19. A first wireless device for announcing operating capabilities to a second wireless device, wherein the first wireless device and second wireless device support a first protocol and a second protocol, comprising:
a processor configured to,
announce original capabilities to the second wireless device;
receive an announcement of capabilities from the second wireless device;
receive frames from the second wireless device in PHY Protocol Data Units (PPDUs) encoded using the first protocol and the second protocol;
announce a change in the first wireless device operating parameters to the second wireless device; and
receive frames from the second wireless device in PPDUs transmitted using the changed operating parameters encoded using the first protocol and the second protocol,
wherein the change in the operating parameters includes a change in a one of a bandwidth parameter, modulation and coding scheme (MCS) parameter, and a number of simultaneous streams (Nss) parameter;
wherein the operating parameter changes are carried in either HE (High Efficiency) Control field or an element; and
wherein the operating parameters further include:
1-bit Additional BW, indicating whether the bandwidth is 320 MHz or not;
4-bit Additional Rx Nss where 8 values are for Nss values of 9 to 16 and an additional one value is used to indicate Rx Nss=8 and this value indicates the maximal Nss at 80 MHz; and 4-bit Additional Tx Nss where 8 values are for Nss values of 9 to 16 and additional one value is used to indicate Rx Nss=8 and this value indicates the maximal Nss at 80 MHz.

20. A method performed by a first wireless device for announcing operating capabilities to a second wireless device, wherein the first wireless device and second wireless device support a first protocol and a second protocol, comprising:

announcing by the first wireless device original capabilities to the second wireless device;

receiving an announcement of capabilities from the second wireless device;

receiving frames from the second wireless device in PHY Protocol Data Units (PPDUs) encoded using the first protocol and the second protocol;

announcing by the first wireless device a change in the first wireless device operating parameters to the second wireless device; and receiving frames from the second wireless device in PPDUs transmitted using the changed operating parameters encoded using the first protocol and the second protocol, wherein the change in the operating parameters includes a change in a one of a bandwidth parameter, modulation and coding scheme (MCS) parameter, and a number of simultaneous streams (Nss) parameter;

wherein the operating parameter changes are carried in an HE (High Efficiency) OM (Operating Mode) Control field;

defining a new EHT (Extreme High Throughput) OM (Operating Mode) Control field to announce EHT operating parameter changes; and combining the new EHT OM Control field with the HE OM Control field to announce the operating parameter changes when either Rx/Tx Nss is more than 8 or a bandwidth is more than 160 MHz.

* * * * *